(12) United States Patent
Sandstrom

(10) Patent No.: US 9,163,126 B2
(45) Date of Patent: *Oct. 20, 2015

(54) SILICA-RICH RUBBER COMPOSITIONS AND METHODS OF MAKING SAME

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 480 days.

This patent is subject to a terminal disclaimer.

(21) Appl. No.: 12/342,561

(22) Filed: Dec. 23, 2008

(65) Prior Publication Data

US 2010/0160513 A1  Jun. 24, 2010

(51) Int. Cl.
| | |
|---|---|
| C08L 93/04 | (2006.01) |
| C08K 3/22 | (2006.01) |
| C08K 3/00 | (2006.01) |
| C08K 5/09 | (2006.01) |
| C08K 5/098 | (2006.01) |
| C08L 21/00 | (2006.01) |
| C08L 9/00 | (2006.01) |
| C08L 9/06 | (2006.01) |

(52) U.S. Cl.
CPC .................. *C08K 3/22* (2013.01); *C08K 3/0033* (2013.01); *C08K 5/09* (2013.01); *C08K 5/098* (2013.01); *C08L 21/00* (2013.01); *C08L 9/00* (2013.01); *C08L 9/06* (2013.01); *C08L 93/04* (2013.01)

(58) Field of Classification Search
CPC ............. C08L 9/06; C08L 9/00; C08L 93/04; C08K 3/22
USPC ......................................... 524/274, 432, 492
See application file for complete search history.

(56) References Cited

U.S. PATENT DOCUMENTS

| | | | |
|---|---|---|---|
| 3,098,837 A | 7/1963 | Haxo, Jr. | |
| 3,257,350 A | 6/1966 | Maass et al. | |
| 3,716,513 A | 2/1973 | Burke, Jr. | |
| 3,998,992 A * | 12/1976 | Nakamura | 428/451 |
| 4,870,135 A * | 9/1989 | Mowdood et al. | 525/236 |
| 4,996,295 A | 2/1991 | Wideman et al. | |
| 5,039,726 A | 8/1991 | Wideman et al. | |
| 5,049,607 A | 9/1991 | Wideman et al. | |
| 5,336,730 A | 8/1994 | Sandstrom et al. | |
| 5,434,206 A | 7/1995 | Wideman et al. | |
| 5,462,979 A * | 10/1995 | Sandstrom | 523/438 |
| 5,639,545 A | 6/1997 | Ball | |
| 5,777,013 A | 7/1998 | Gardiner et al. | |
| 6,120,911 A | 9/2000 | Beers et al. | |
| 6,220,326 B1 | 4/2001 | Blok et al. | |
| 6,251,992 B1 | 6/2001 | Sandstrom | |
| 6,378,582 B1 | 4/2002 | Sandstrom et al. | |
| 6,774,185 B2 * | 8/2004 | Lin et al. | 525/191 |
| 7,207,366 B2 | 4/2007 | Sandstrom et al. | |
| 7,326,748 B2 | 2/2008 | Ajbani et al. | |
| 7,737,204 B2 * | 6/2010 | Sandstrom | 524/270 |
| 2006/0130948 A1 | 6/2006 | Sandstrom et al. | |
| 2007/0072984 A1 | 3/2007 | Sandstrom | |
| 2007/0137745 A1 | 6/2007 | Lukich et al. | |

FOREIGN PATENT DOCUMENTS

| | | |
|---|---|---|
| EP | 2052878 A1 | 4/2009 |
| GB | 1042257 A | 9/1966 |
| WO | 93/02021 A1 | 2/1993 |

OTHER PUBLICATIONS

"Rosin and Rosin Derivatives", Encyclopedia of chemical technology, Second Edition, 1968, 475-508.*
European Patent Office, European Search Report issued in corresponding European Patent Application No. 09179834.8 dated Apr. 7, 2010.

* cited by examiner

*Primary Examiner* — Wenwen Cai
(74) *Attorney, Agent, or Firm* — Wood, Herron & Evans, LLP

(57) ABSTRACT

The invention includes a silica-rich rubber composition, which exhibits good processing characteristics and improved wet traction characteristics, a method for making and a tire having a tread component including the same. In one embodiment, a rubber composition includes at least one elastomer, from about 30 phr to about 120 phr silica reinforcing filler, from about 0 phr to about 30 phr carbon black reinforcing filler, from about 3 phr to about 10 phr of rosin acid, and from about phr to about 7 phr of zinc oxide, provided that no free stearic acid is separately included in the rubber composition.

19 Claims, No Drawings

SILICA-RICH RUBBER COMPOSITIONS AND METHODS OF MAKING SAME

FIELD OF THE INVENTION

The present invention relates to silica-rich rubber compositions and methods of making same.

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because it will enhance fuel economy. Good tread wear is an important consideration because it is generally an important factor that determines the life of the tire.

Overall, tire characteristics, such as traction, tread wear, and rolling resistance, are dependent to a large extent on the dynamic viscoelastic properties of the elastomers utilized in making up a tire. But, these tire properties may also be affected by the fillers and additives that are used in preparing the rubber compositions that make up the tire.

It is known that silica fillers may improve rubber properties, such as increased tear resistance, reduced rolling resistance and increased road traction, and thus improve fuel economy for vehicles. But, one difficulty encountered with increasing the silica content is a reduction in processability for green rubber compositions. A rubber composition containing a high level of silica exhibits high green viscosity values, which can make it very difficult to process or extrude the high silica content rubber at reasonable extrusion rates.

Some approaches to improving the processability, i.e. the green viscosity, of high silica content rubber compositions have focused upon the addition sequence of ingredients during mixing, the addition of de-agglomeration agents and using elevated levels of coupling agents. Another recent approach is to increase the amount of processing aids, such as stearic acid.

Unfortunately, higher levels of processing aids, particularly stearic acid, can have a negative effect because excess stearic acid tends to gradually migrate to the surface of the rubber composition and create a surface bloom thereon. This stearic acid migration tends to reduce the coefficient of friction for the rubber surface.

Accordingly, a challenge exists whereby desirable wet traction characteristics of cured rubber compositions are balanced against the processability of its corresponding green rubber composition. Therefore, what is needed is a rubber composition and a process for making same, wherein the rubber composition maintains a desirable green viscosity value, but possesses enhanced wet tractions characteristics when cured, without sacrificing other desirable characteristics.

SUMMARY OF THE INVENTION

In accordance with an embodiment of the invention, a silica-rich rubber composition is provided that includes at least one elastomer, from about 30 parts by weight per 100 parts by weight rubber (phr) to about 120 phr silica reinforcing filler, from about 0 phr to about 30 phr carbon black reinforcing filler, from about 3 phr to about 10 phr of rosin acid, and from about 1 phr to about 7 phr of zinc oxide, provided that no free stearic acid is separately included in the rubber composition.

In another embodiment, a method of preparing a tire tread rubber composition having a silica-rich rubber composition is provided. The method has a non-productive stage, wherein mixing at least one elastomer, from about 30 phr to about 120 phr silica reinforcing filler, from about 0 phr to about 30 phr carbon black reinforcing filler, from about 3 phr to about 10 phr of rosin acid, and from about 1 phr to about 7 phr of zinc oxide, occurs at a temperature from about 140° C. to about 190° C. The non-productive stage is subsequently followed by the productive stage, which includes mixing a sulfur curing agent at a temperature from about 100° C. to about 120° C. with the non-productive stage components, with the proviso that no free stearic acid is separately included in the rubber composition.

In yet another embodiment, a tire is provided that has a tire tread having a silica-rich rubber composition that includes at least one elastomer, from about 30 phr to about 120 phr silica reinforcing filler, from about 0 phr to about 30 phr carbon black reinforcing filler, from about 3 phr to about 10 phr of rosin acid, and from about 1 phr to about 7 phr of zinc oxide, provided that no free stearic acid is separately included in the rubber composition.

By virtue of the foregoing, there is thus provided a silica-rich rubber composition, which possesses improved wet traction characteristics and retains favorable processing characteristics for the green rubber composition and a method for making the same.

DETAILED DESCRIPTION OF THE INVENTION

The silica-rich rubber composition of this invention may be utilized in making tire tread compositions having a balanced combination of properties including desirable wet and dry traction, good wear resistance, and low rolling resistance. Such tire tread compositions can be made by blending at least one or more elastomers, e.g., natural rubber (NR), polybutadiene rubber (PBD), isoprene/butadiene rubber (IBR), solution-polymerized styrene butadiene rubber (s-SBR) and styrene/isoprene/butadiene rubber (SIBR), with silica filler, zinc oxide, and rosin acid, further provided that no free stearic acid is separately included in the rubber composition. Also, other fillers and additives, such as carbon black, can be included in these tire tread compositions.

In one aspect of this invention, the silica-rich rubber composition includes at least one or more elastomers that may be derived from monomers, such as conjugated diolefin monomers and vinyl-containing monomers. Exemplary conjugated diolefin monomers include butadiene, isoprene, hexadienes, 2,3-dimethyl-1,3-butadiene, piperylene, 3-butyl-1,3-octadiene, 2-phenyl-1,3-butadiene, and the like, alone or in admixture. Generally, 1,3-butadiene and isoprene are the most commonly utilized conjugated diolefin monomers. Exemplary vinyl-containing monomers include styrene, α-methylstyrene, bromostyrene, chlorostyrene, fluorostyrene, 4-phenylstyrene, 3-methylstyrene, chloromethylstyrene, divinyl benzene, diisopropenylbenzene, 1-vinylnaphthalene, 2-vinylnaphthalene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Generally, styrene and α-methylstyrene are the most commonly utilized vinyl-containing monomers.

Some representative examples of the elastomers that may be prepared from the above exemplary monomers include polybutadiene (PBD), polyisoprene or natural rubber (NR), styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber, and α-methylstyrene-styrene-isoprene-butadiene rubber. Additionally, functionalized versions, as are commonly known in the art, may also be prepared and are amenable for use in the silica-rich rubber composition.

The silica-rich rubber composition may also contain minor amounts (e.g. up to about 25 phr) of saturated polymers, such as those comprised of EPDM (ethylene/propylene/non-conjugated diene terpolymer rubber), butyl rubber, halobutyl rubber and brominated copolymers of paramethylstyrene and isobutylene and mixtures thereof, for example.

Elastomers suitable for preparing the silica-rich rubber compositions may be prepared and recovered according to various known methods. And, the polymerization of monomers may be carried out in a number of different polymerization reactor systems, including but not limited to bulk polymerization, vapor phase polymerization, solution polymerization, suspension polymerization, emulsion polymerization, and precipitation polymerization systems, and may be conducted under batchwise, semi-continuous or continuous operations. The chosen polymerization method (e.g. emulsion or solution polymerization) can depend upon the particular monomers being polymerized and the desired characteristics for the at least one or more rubbers being synthesized. Commercially preferred methods of polymerization include solution, bulk, and emulsion polymerization.

Along with the one or more elastomers, the silica-rich rubber composition further includes at least one silica reinforcing filler. In one embodiment, the silica-rich rubber composition may contain from about 30 phr to about 120 phr, alternately from about 50 phr to about 100 phr, of silica reinforcing filler so as to define a silica-rich composition. The silica reinforcing fillers may include precipitated silicas such as, for example, those obtained by the acidification of a soluble silicate, e.g., sodium silicate. Such precipitated silica fillers are well known to those having skill in the art.

Generally speaking, suitable silica reinforcing filler for the rubber composition may be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc.; silicas available from Rhone-Poulenc, with, for example, designations of Z1165MP and Z165GR; and silicas available from Degussa AG with, for example, designations VN2 and VN3, etc. and silicas available from Huber having, for example, a designation of Hubersil 8745.

The silica filler may optionally be used in conjunction with a silica coupling agent to couple the silica to the elastomer(s), to thus enhance its effect as reinforcement for the elastomer composition. Such silica coupling agents are well known and typically have a moiety reactive with hydroxyl groups (e.g. silanol groups) contained on the silica and another moiety interactive with the elastomer(s), such as the conjugated diolefin-based elastomers, to create a silica-to-rubber coupling effect.

Specific examples of sulfur containing organosilicon compounds which may be used as the silica coupling agent in accordance with the present invention include: 3,3'-bis(trimethoxysilylpropyl)disulfide, 3,3'-bis(triethoxysilylpropyl) tetrasulfide, 3,3'-bis(triethoxysilylpropyl)octasulfide, 3,3'-bis(trimethoxysilylpropyl)tetrasulfide, 2,2'-bis (triethoxysilylethyl)tetrasulfide, 3,3'-bis (trimethoxysilylpropyl)trisulfide, 3,3'-bis (triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis (methoxydiethoxysilylethyl)tetrasulfide, 2,2'-bis (tripropoxysilylethyl)pentasulfide, 3,3'-bis (tricyclonexoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxy ethoxy propoxysilyl 3'-diethoxybutoxysilylpropyltetrasulfide, 2,2'-bis(dimethyl methoxysilylethyl)disulfide, 2,2'-bis(dimethyl sec.butoyxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl) trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis (triethoxysilylhexyl)tetrasulfide, 12,12'-bis(triisopropoxysilyl dodecyl)disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl)tetrasulfide, 4,4'-bis(trimethoxysilylcyclohexylene)tetrasulfide, 5,5'-bis (dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

Another class of suitable coupling agents include organoalkoxy-mercaptosilane compositions of the general Formula (I) represented as:

$$(X)_n(R^7O)_{3-n}—Si—R^8—SH \qquad (I)$$

wherein X is a radical selected from chlorine, bromine and $C_1$-$C_4$ alkyl group; $R^7$ is $C_1$-$C_4$ alkyl radical; $R^8$ is a $C_1$-$C_4$ alkylene radical; and n is an average value of from zero through 3, and where n is equal to zero or 1, $R^7$ may be the same or different for each ($R^7$O) moiety in the composition.

Representative organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Moreover, the organoalkoxy-mercaptosilane of the general Formula (I) may be capped with a moiety which uncaps the organoalkoxy-mercaptosilane upon heating to an elevated temperature. A representative example of a capped organoalkoxy-mercaptosilane coupling agent useful for this invention is a liquid 3-octanoylthio-1-propyltriethoxysilane as NXT™ Silane from the GE Silicones Company.

Other optional fillers, such as calcium carbonate, clay, mica, talc, titanium dioxide, starch, wood flower, carbon black, or mixtures thereof, may also be included in the rubber composition in conventional amounts. In the silica-rich rubber compositions that include carbon black as a reinforcing co-filler, the carbon black may be included in amounts ranging from greater than 0 phr to about 30 phr. In another example, the carbon black may be included in an amount ranging from about 5 phr to about 25 phr. The carbon blacks may include any of the commonly available, commercially-produced carbon blacks, such as those having a surface area (EMSA) of at least 20 $m^2$/g. Other carbon blacks that may be utilized include acetylene blacks. Mixtures of two or more types of carbon blacks can be used in preparing the carbon black products of the invention. The carbon blacks utilized in the preparation of rubber compounds may be in pelletized form or an unpelletized flocculent mass. Preferably, for more uniform mixing, unpelletized carbon black is preferred.

Conventionally, fatty acids, such as stearic acid, are included in the formulation of compounded rubber, along with zinc oxide, which forms zinc stearate. It is generally understood that this combination may serve as a processing aid, a softener, an accelerator activator and/or a dispersing agent in the rubber compounding and curing processes. But as disclosed herein, the silica-rich rubber compositions, according to embodiments of the present invention, contain no additional free stearic acid, i.e., no free stearic acid is separately included in the rubber composition.

The distinction of the phrase "no additional free stearic acid" is to recognize that in some instances, an elastomer component, which can be suitable for use in forming silica-rich rubber compositions, may contain small quantities of fatty acids, such as stearic acid. For example, emulsion polymers can often contain up to about 2 phr of fatty acids. The residual fatty acid in emulsion polymers is derived from the use of fatty acids as a surfactant in the emulsion polymerization process. Another elastomer that may contain stearic acid is natural rubber, which may contain up to about 1 phr of stearic acid. For example, TSR 20 natural rubber will ordinarily contain an average of from about 0.03 wt % to about 1 wt % naturally occurring, not free addition, $C_{18}$ fatty acids, which can include naturally occurring stearic acid. Therefore, it should be understood that in silica-rich rubber compositions derived from emulsion polymers or natural rubber, for example, there can be up to about 2 phr or so of a fatty acid. In view of the foregoing, if a totally fatty acid-free composition is desired, solution-polymerized SBR and PBD may be used, for example, because these elastomers do not contain the naturally occurring $C_{18}$ fatty acids, nor would they contain any fatty acid content in the absence of an emulsion soap system.

Instead of stearic acid, rosin acids are utilized in place thereof in the silica-rich rubber compositions. To that end, zinc rosinates may be formed in situ by the combination with zinc oxide. Alternatively, zinc rosinates may be separately formed and added to the compounding rubber composition. The amount of rosin acid included in the silica-rich rubber composition may range from about 3 phr to about 10 phr. In another example, the rosin acid may range from about 5 phr to about 8 phr. The amount of zinc oxide may range from about 1 phr to about 7 phr. In another example, the zinc oxide may range from about 3 phr to about 5 phr. It has been observed that replacing stearic acid by an equivalent amount of rosin acid in a silica-rich rubber composition produces an unexpected and significant increase in the wet coefficient of friction, while maintaining other desirable processing parameters.

The rosin acids suitable for use in the silica-rich rubber compositions include gum rosin acid, wood rosin acid and tall oil rosin acid, and hydrogenated and disproportionated forms thereof, which are well known to those skilled in such art. For example, see "Rosin and Rosin Derivatives", found in the *Encyclopedia of Chemical Technology*, Second Edition, 1968, Pages 475 through 508.

In practice, it is readily understood by those having skill in the art that the silica-rich rubber compositions may be compounded by methods generally known in the rubber compounding art, such as by mixing the various sulfur-vulcanizable constituent elastomer(s) with silica filler, rosin acid, zinc oxide, and optionally other various, commonly-used additive materials. These additive materials include processing additives, such as oils and tackifying resins; pigments; antidegradants, such as waxes, antioxidants and antiozonants; peptizing agents, reinforcing materials and curing aids, such as sulfur, activators, retarders and accelerators. As known to those skilled in the art, depending on the intended use of the sulfur vulcanizable and sulfur-vulcanized material (rubbers), the additives mentioned above are selected and commonly used in conventional amounts. Again, no free stearic acid is separately included in the rubber composition.

Typical amounts of tackifier resins, if used, may, for example, comprise about 0.5 to about 10 phr, usually about 1 to about 5 phr. Typical amounts of processing aids may comprise 1 to 20 phr. Such processing aids can include, for example, aromatic, naphthenic, and/or paraffinic processing oils.

Typical amounts of antioxidants, where used, may comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants, where used, may comprise about 1 to about 5 phr. Typical amounts of waxes, if used, may comprise about 1 to about 5 phr. Often microcrystalline waxes are used. Typical amounts of peptizers, if used, may comprise about 0.1 to about 1 phr. Typical peptizers may be, for example, pentachlorothiophenol and dibenzamidodiphenyl disulfide.

The vulcanization is conducted generally in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, with a range of from about 1 to about 2.5 phr being commonly useful.

Accelerators are used to control the time and/or temperature required for vulcanization and to improve the properties of the vulcanizate. In one embodiment, a single or primary accelerator system may be used. Conventionally, a primary accelerator is used in amounts ranging from about 0.5 to about 2.0 phr. In another embodiment, combinations of two or more accelerators in which the primary accelerator is generally used in the larger amount (0.5 to 2 phr), and a secondary accelerator which is generally used in smaller amounts (0.05 to 0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. It is common in the art to select a sulfenamide as the primary accelerator. If a second accelerator is used, the secondary accelerator is generally a guanidine, dithiocarbamate or thiuram compound.

In practice, sulfur vulcanized rubber compositions are typically prepared by thermomechanically mixing the elastomer(s) and the other various ingredients in a sequentially step-wise manner followed by shaping and curing the rubber composition to form a vulcanized product. First, for the aforesaid mixing of the elastomer(s) and other various ingredients, typically exclusive of sulfur and sulfur vulcanization accelerators, the polymer(s) and various rubber compounding ingredients are blended in one or more non-productive thermomechanical mixing stage(s) in suitable mixers. Such non-productive mixing is usually conducted at temperatures in a range of about 140° C. to 190° C. and often in a range of about 150° C. to 180° C.

Following such non-productive mixing stage, or stages, in a final mixing stage, sometimes referred to as a productive mix stage, sulfur and sulfur vulcanization accelerators (curatives), and sometimes optionally one or more additional ingredients, are mixed with the rubber compound, or composition, typically at a significantly lower temperature in a range of about 100° C. to about 120° C., which is a lower temperature than the temperatures utilized in the non-productive mix stages in order to prevent or retard premature curing of the sulfur curable rubber, which is sometimes referred to as scorching, of the rubber composition.

The rubber mixture, sometimes referred to as a rubber compound or composition, is typically allowed to cool, sometimes before or after intermediate mill mixing of the rubber composition, between the aforesaid various mixing steps, for example, to a temperature below 50° C. Such sequential non-productive mixing steps, including the intermediary mill mixing steps and the concluding final productive mixing step are well known to those having skill in the rubber mixing art.

By thermomechanical mixing, it is meant that the rubber compound, or composition of rubber and rubber compounding ingredients, is mixed in a rubber mixture under high shear conditions where the mixture may autogeneously heat up, with an accompanying temperature rise, as a result of the mixing primarily due to shear and associated friction within the rubber mixture in the rubber mixer. In practice, it is readily understood by those having skill in the art that at least one non-productive mixing stage at an elevated temperature is followed by a productive (PR) mixing stage at a lower temperature.

The tire can be built, shaped, molded and cured by various methods which will be readily apparent to those having skill in such art.

Non-limiting examples of silica-rich rubber compositions in accordance with the description are now disclosed below. These examples are merely for the purpose of illustration and are not to be regarded as limiting the scope of the invention or the manner in which it can be practiced. Other examples will be appreciated by a person having ordinary skill in the art.

Experiments were conducted to evaluate the feasibility of introducing rosin acid in place of stearic acid, in combination with zinc oxide to enable an in situ formation of zinc rosinate within the rubber composition, in a silica-rich rubber composition.

To that end, silica-rich rubber compositions, i.e., Samples A through F identified in Table I, were prepared as follows. Each of Samples A-F included a blend of elastomers, as shown below. Sample A was a Control Sample formulated with a combination of 3 phr zinc oxide and 1 phr stearic acid to form zinc stearate in situ within the rubber composition. Samples B and C were formulated with 3 phr and 6 phr of stearic acid, respectively, while maintaining 3 phr zinc oxide. Samples D, E, and F were formulated with 3 phr zinc oxide and rosin acid (instead of stearic acid) in amounts of 1 phr, 3 phr, and 6 phr of rosin acid, respectively to form zinc rosinate in situ within the rubber compositions.

TABLE 1

|  | phr |
|---|---|
| Non-Productive Mixing Stage (4 min to a 170° C. drop temperature) | |
| Solution SBR[1] | 74 |
| Cis 1,4-Polybutadiene[2] | 26 |
| Silica[3] | 73 |
| Carbon Black | 10 |
| Processing Oil, Wax | 9 |
| Silane coupling agent[4] | 6.5 |
| Antidegradent[5] | 3 |
| Zinc Oxide | 3 |
| Traction Resin[6] | 5 |
| Stearic acid (A-C) or rosin acid[7] (D-F) | 1, 3 and 6 |
| 2$^{nd}$ Non-Productive Mixing Stage | |
| Additional mixing - 3 minutes at 160° C. Productive Mixing Stage (2 min to a 120° C. drop temperature) | |
| Sulfur | 1.9 |
| Sulfenamide accelerator | 1.7 |
| Diphenyl guanidine accelerator | 1.5 |

[1]SLF31X22 from the Goodyear Tire & Rubber Company
[2]Budene 1207 from the Goodyear Tire & Rubber Company
[3]Z1165MP from Rhone-Poulenc
[4]NXT ™ Silane from GE Silicones
[5]Amine-type
[6]Coumarone-indene resin
[7]Gum Rosin The rubber composition samples were prepared by mixing the elastomers together with the identified rubber compounding ingredients in a first non-productive mixing stage (NP) in an internal rubber mixer for about 4 minutes at a temperature of about 170° C. The mixture was then further sequentially mixed in a second non-productive mixing stage (NP) in an internal rubber mixer, with no additional ingredients added, for about 3 more minutes at a temperature of about 160° C. The resulting mixture was then mixed in a productive mixing stage (P) in an internal rubber mixer with curatives for about 2 minutes at a temperature of about 120° C. The rubber composition was cooled to below 40° C. between each of the non-productive mixing steps and between the second non-productive mixing step and the productive mixing step.

The following Table 2 illustrates cure behavior and various physical properties of the silica-rich rubber compositions based on the basic recipe of Table 1 and reported herein as Samples A-F.

TABLE 2

| | \multicolumn{6}{c}{SAMPLES} | | | | | |
|---|---|---|---|---|---|---|
| | A | B | C | D | E | F |
| Processing[1] | | | | | | |
| Uncured G' Wet[2] | 256 | 203 | 184 | 249 | 224 | 187 |
| 0° C. Rebound | 19 | 18 | 19 | 18 | 17 | 15 |
| 23° C. Rebound | 36 | 38 | 34 | 34 | 31 | 28 |
| Handling[3] | | | | | | |
| G' @ 10% | 2261 | 1854 | 1598 | 2157 | 2100 | 1477 |
| Modulus @300% | 10.4 | 9.1 | 8.3 | 10.6 | 9.1 | 7.4 |
| Hot Hardness RR (HBU)[4] | 60 | 59 | 59 | 59 | 59 | 60 |
| Reb100° C. | 56 | 58 | 61 | 55 | 52 | 51 |
| TD@100° C. RPA | 0.14 | 0.12 | 0.11 | 0.14 | 0.14 | 0.13 |
| Wear[5] | | | | | | |
| DIN Abrasion | 108 | 137 | 135 | 115 | 131 | 143 |
| COF[6] | | | | | | |
| Dry | 1.54 | 1.53 | 1.57 | 1.62 | 1.56 | 1.64 |
| Wet | 0.32 | 0.34 | 0.33 | 0.35 | 0.43 | 0.52 |
| Tear | | | | | | |
| Original | 82 | 77 | 76 | 81 | 97 | 135 |

[1]Uncured G' was measured using ASTM D6601 on an RPA 2000.
[2]Rebound was measured using ASTM D1054
[3]Modulus @ 300% was measured using ASTM D1042
[4]Rebound @ 100° C. was measured using ASTM D1415
[5]DIN Abrasion was measured using ASTM 5963
[6]Coefficient of friction (COF) measured using ASTM D-1894. COF value for a rubber sample may be measured, for example, on a Model SP-2000 Slip/Peel tester from IMASS, Inc. at 6 inches (about 15.2 cm) per minute using a 200 g sled against a substrate surface such as, for example, a polished aluminum surface.

From Table 2, it can be seen that the processing variable Uncured G' decreases with increasing levels of stearic acid starting from 1 phr in Sample A, to 3 phr in Sample B, then to 6 phr in Sample C. This same decrease in Uncured G' is Similarly, observed in Samples D-F. Additionally, in Samples A-C, the increase of stearic acid provides no appreciable change in either of the dry or wet coefficient of friction (COF) values. However the coefficient of friction values for Samples D, E, and F (which contained the zinc rosinate instead of the zinc stearate formed in situ within the rubber composition as a product of added rosin acid and zinc oxide) were dramatically improved for wet substrate conditions as compared to Samples A, B, and C, which contained the added zinc stearate.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed:

1. A tire tread comprising a rubber composition comprising:
   100 parts of at least one elastomer selected from the group consisting of homopolymers of isoprene, homopolymers of 1,3-butadiene, copolymers of isoprene and 1,3-butadiene, copolymers of isoprene and styrene, copolymers of isoprene and α-methylstyrene, copolymers of 1,3-butadiene and styrene, and copolymers of 1,3-butadiene and α-methylstyrene, wherein the at least one elastomer is the total elastomer of the rubber composition,
   from about 50 phr to about 120 phr silica reinforcing filler,
   from about 0 phr to about 30 phr carbon black reinforcing filler,
   from 3 phr to about 6 phr of rosin acid, and
   from about 1 phr to about 7 phr of zinc oxide, wherein the rubber composition is free from stearic acid.

2. The tire tread of claim 1 wherein the silica reinforcing filler includes a precipitated silica and wherein the composition further includes a silica coupler having a moiety reactive with a hydroxyl group on the precipitated silica and another moiety interactive with a conjugated diene-based elastomer.

3. The tire tread of claim 1 wherein the rosin acid includes gum rosin acid, wood rosin acid, tall oil rosin acid, hydrogenated or disproportionated forms thereof, or mixtures thereof.

4. The tire tread of claim 3 wherein the rosin acid includes gum rosin acid.

5. The tire tread of claim 3 wherein the rosin acid includes wood rosin acid or tall oil rosin acid.

6. The tire tread of claim 1, wherein the rubber composition comprises:
   from 50 phr to 100 phr of the silica reinforcing filler,
   from 5 phr to 25 phr of the carbon black reinforcing filler,
   from 3 phr to 6 phr of the rosin acid, and
   3 phr of zinc oxide.

7. A tire comprising:
   a tire tread including a rubber composition comprising:
      100 parts of at least one elastomer selected from the group consisting of homopolymers of isoprene, homopolymers of 1,3-butadiene, copolymers of isoprene and 1,3-butadiene, copolymers of isoprene and styrene, copolymers of isoprene and α-methylstyrene, copolymers of 1,3-butadiene and styrene, and copolymers of 1,3-butadiene and α-methylstyrene, wherein the at least one elastomer is the total elastomer of the rubber composition,
      from about 50 phr to about 120 phr silica reinforcing filler,
      from about 0 phr to about 30 phr carbon black reinforcing filler,
      from 3 phr to about 6 phr of rosin acid, and
      from about 1 phr to about 7 phr of zinc oxide, wherein the rubber composition is free from stearic acid.

8. The tire of claim 7 wherein the silica filler includes a precipitated silica and wherein the composition further includes a silica coupler having a moiety reactive with a hydroxyl group on the precipitated silica and another moiety interactive with a conjugated diene-based elastomer.

9. The tire of claim 7 wherein the rosin acid is gum rosin acid, wood rosin acid, tall oil rosin acid, hydrogenated or disproportionated forms thereof, or mixtures thereof.

10. The tire of claim 9 wherein the rosin acid is gum rosin acid.

11. The tire of claim 9 wherein the rosin acid is wood rosin acid or tall oil rosin acid.

12. The tire of claim 7, wherein the at least one elastomer is fatty acid-free.

13. The tire of claim 7 wherein the rubber composition comprises:
   from 50 phr to 100 phr of the silica reinforcing filler,
   from 5 phr to 25 phr of the carbon black reinforcing filler,
   from 3 phr to 6 phr of the rosin acid, and
   3 phr of zinc oxide.

14. A method of preparing a tire tread rubber composition comprising:
in a non-productive stage, mixing at least the following components at a temperature from about 140° C. to about 190° C.:
(1) 100 parts of at least one elastomer selected from the group consisting of homopolymers of isoprene, homopolymers of 1,3-butadiene, copolymers of isoprene and 1,3-butadiene, copolymers of isoprene and styrene, copolymers of isoprene and α-methylstyrene, copolymers of 1,3-butadiene and styrene, and copolymers of 1,3-butadiene and α-methylstyrene, wherein the at least one elastomer is the total elastomer of the rubber composition;
(2) from about 0 phr to about 30 phr of carbon black reinforcing filler;
(3) from about 50 phr to about 120 phr silica reinforcing filler;
(4) from 3 phr to about 6 phr of rosin acid, and
(5) from about 1 phr to about 7 phr of zinc oxide; and
subsequently mixing with the non-productive stage components, a sulfur curing agent at a temperature from about 100° C. to about 120° C.,
wherein the rubber composition is free from stearic acid.

15. The method of claim 14 wherein the at least one elastomer is selected from the group consisting of homopolymers of isoprene, homopolymers of 1,3-butadiene, and copolymers of isoprene and 1,3-butadiene.

16. The method of claim 14 wherein the silica filler includes a precipitated silica and wherein the composition further includes a silica coupler having a moiety reactive with a hydroxyl group on the precipitated silica and another moiety interactive with a conjugated diene-based elastomer.

17. The method of claim 14 wherein the rosin acid is gum rosin acid, wood rosin acid, tall oil rosin acid, hydrogenated or disproportionated forms thereof, or mixtures thereof.

18. The method of claim 17 wherein the rosin acid is gum rosin acid.

19. The method of claim 17 wherein the rosin acid is wood rosin acid or tall oil rosin acid.

* * * * *

UNITED STATES PATENT AND TRADEMARK OFFICE
CERTIFICATE OF CORRECTION

Page 1 of 1

PATENT NO. : 9,163,126 B2
APPLICATION NO. : 12/342561
DATED : October 20, 2015
INVENTOR(S) : Paul Harry Sandstrom It is certified that error appears in the above-identified patent and that said Letters Patent is hereby corrected as shown below:

On the Title Page:

(57) Abstract, line 9, "about phr to about 7 phr of zinc oxide," should read --about 1 phr to about 7 phr of zinc oxide,--

Signed and Sealed this
Twenty-second Day of March, 2016

Michelle K. Lee
*Director of the United States Patent and Trademark Office*